(12) United States Patent
Gimeno et al.

(10) Patent No.: US 12,240,784 B2
(45) Date of Patent: Mar. 4, 2025

(54) CEMENTITIOUS HYBRID FLOORING COMPOSITION

(71) Applicant: SIKA TECHNOLOGY AG, Baar (CH)

(72) Inventors: Patricia Gimeno, Stuttgart (DE); Carola Kaddatz, Oppenweiler (DE); Jochen Grötzinger, Schwäbisch Gmünd (DE); Till Weikert, Ludwigsburg (DE)

(73) Assignee: SIKA TECHNOLOGY AG, Baar (CH)

( * ) Notice: Subject to any disclaimer, the term of this patent is extended or adjusted under 35 U.S.C. 154(b) by 796 days.

(21) Appl. No.: 17/419,214

(22) PCT Filed: Mar. 9, 2020

(86) PCT No.: PCT/EP2020/056240
§ 371 (c)(1),
(2) Date: Jun. 28, 2021

(87) PCT Pub. No.: WO2020/178457
PCT Pub. Date: Sep. 10, 2020

(65) Prior Publication Data
US 2022/0089491 A1    Mar. 24, 2022

(30) Foreign Application Priority Data
Mar. 7, 2019 (EP) ..................... 19161344

(51) Int. Cl.
| | | |
|---|---|---|
| C04B 18/28 | (2006.01) | |
| C04B 14/06 | (2006.01) | |
| C04B 14/28 | (2006.01) | |
| C04B 24/26 | (2006.01) | |
| C04B 28/04 | (2006.01) | |
| C04B 111/00 | (2006.01) | |
| C04B 111/60 | (2006.01) | |
| E01C 7/35 | (2006.01) | |
| E01C 19/16 | (2006.01) | |
| E01C 19/48 | (2006.01) | |

(52) U.S. Cl.
CPC .......... C04B 24/2623 (2013.01); C04B 14/06 (2013.01); C04B 14/28 (2013.01); C04B 24/2688 (2013.01); C04B 28/04 (2013.01); C04B 2111/0075 (2013.01); C04B 2111/60 (2013.01); E01C 7/358 (2013.01); E01C 19/16 (2013.01); E01C 19/4873 (2013.01)

(58) Field of Classification Search
None
See application file for complete search history.

(56) References Cited

U.S. PATENT DOCUMENTS

| | | |
|---|---|---|
| 6,106,608 A | 8/2000 | Andree et al. |
| 2010/0190888 A1 | 7/2010 | Gaeberlein et al. |
| 2014/0275307 A1 | 9/2014 | Dombrowski et al. |
| 2016/0244367 A1* | 8/2016 | Gimeno Santos ...... C04B 26/14 |
| 2016/0304399 A1 | 10/2016 | Kuryatnyk et al. |
| 2017/0275204 A1 | 9/2017 | Assmann et al. |
| 2018/0050963 A1 | 2/2018 | Hesse et al. |
| 2018/0179108 A1* | 6/2018 | Yu .................. C08F 220/20 |

FOREIGN PATENT DOCUMENTS

| | | | | |
|---|---|---|---|---|
| CN | 106116296 A | * | 11/2016 | |
| DE | 10 2008 020 737 A1 | | 10/2009 | |
| EP | 1 609 770 B1 | | 3/2013 | |
| EP | 2 944 622 A1 | | 11/2015 | |
| EP | 2 313 351 B1 | | 3/2016 | |
| KR | 10-1677457 B1 | | 11/2016 | |
| RO | 120631 B1 | | 5/2006 | |
| WO | WO-2010018017 A2 | * | 2/2010 | ........... C04B 24/023 |
| WO | 2014/174033 A2 | | 10/2014 | |
| WO | 2016/001256 A1 | | 1/2016 | |
| WO | 2017/021854 A1 | | 2/2017 | |

OTHER PUBLICATIONS

Petit, J-Y. et al., "Effect of formulation parameters on adhesive properties of ANSI 118-15 and 118-11 compliant tile adhesive mortars", International Journal of Adhesion & Adhesives 2016, 66, 73-80. (Year: 2016).*
Zhao et al., "Preparation and properties of an environment friendly polymer-modified waterproof mortar," Construction and Building Materials, 2011, vol. 25, pp. 2635-2638.
May 29, 2020 International Search Report issued in International Patent Application No. PCT/EP2020/056240.
May 29, 2020 Written Opinion of the International Searching Authority issued in International Patent Application No. PCT/EP2020/056240.
Jean-Yves Petit et al., "Effect of formulation parameters on adhesive properties of ANSI 118-15 and 118-11 compliant tile adhesive mortars", International Journal of Adhesion & Adhesives 66, (2016) pp. 73-80.
"Elotex® AP 200" Technical Datasheet Supplied by Celanese, Universal Selecter by SpecialChem.
Metakaolin, https://beton.wiki/index.pgp?title=Metakaolin&oldid=12451, Sep. 2, 2022.

* cited by examiner

*Primary Examiner* — Richard A. Huhn
(74) *Attorney, Agent, or Firm* — Oliff PLC

(57) ABSTRACT

A multi-component composition comprising a first component including water, and a second component including at least one hydraulic binder, wherein the multi-component composition includes a copolymer CP, wherein the copolymer is a vinyl versatate copolymer CPA, and/or a copolymer based on styrene and (meth) acrylic acid esters CPB. The amount of hydraulic binder, based on the total weight of the multi-component composition, is from 25-65 weight-%. The multi-component composition is especially suitable as a flooring material for industrial floors and car parks.

20 Claims, No Drawings

CEMENTITIOUS HYBRID FLOORING COMPOSITION

TECHNICAL FIELD

The invention relates to cementitious hybrid flooring materials, in particular for the manufacture of industrial flooring or car park flooring.

BACKGROUND OF THE INVENTION

Today there exist several requirements for floor covering systems, especially for industrial flooring and car park flooring.

Among other properties, especially flexibility is required for industrial floors nowadays, in particular, when designing large concrete slabs in order to bridge the minimum crack width (usually 0.2 to 0.4 mm). Large floor areas also require the system to be cost effective, resulting in low prices for the resin and providing sufficient adhesion on the substrate as well as good mechanical properties, especially with respect to compressive strength.

Furthermore, specific legislation for industrial flooring such as water protection law of German speaking countries (WHG § 19) requests flexibility among abrasion and chemical resistance. Car park floorings require as well high abrasion resistance, but also crack bridging properties and especially, for ground bearing slabs, the resistance to upcoming moisture.

There is also a need for self-levelling flooring products that reach the required <3 MJ/kg required by the standard EN ISO 1716 of the EN13501/1 for a fire classification $A_{fl}$-S2.

Epoxy or polyurethane resins are typically used for such flooring applications. However, typical products do not satisfy the requirements of the fire classification $A_{fl}$-S2.

Thus, there is a demand for flooring systems, especially industrial flooring and car park flooring, which provide sufficient flexibility, mechanical proprieties, especially compressive strength, adhesion and fire resistance with preferably good abrasion resistance.

EP 2944622 A1 relates to a three component composition for the manufacture of polyurethane cementitious hybrid flooring or coating with improved surface gloss consisting of a polyol component (A) comprising at least two polyols and water, a polyisocyanate component (B) comprising a methylene diphenyl diisocyanate product with an average NCO functionality of at least 2.5, or a methylene diphenyl diisocyanate product with an average NCO functionality of at least 2 and at least one further polyol with an amount of between 1% and 30% based on the weight of said polyisocyanate component (B), wherein said MDI product and said polyol have reacted at least partially, and a powder component (C) comprising at least one hydraulic binder and optionally one or more aggregates.

WO 2014/174033 A2 describes a three component composition for flooring applications comprising a component (A) including calcined paper sludge and aggregates, a component (B) including a binder selected from polyol, epoxy resin and polymer latex dispersion, and a component (C) including a isocyanate hardener.

SUMMARY OF THE INVENTION

Therefore, the object of the invention was to overcome the problems of the prior art discussed above, in particular to provide sufficient flexibility, mechanical proprieties, especially compressive strength, adhesion and fire resistance with preferably good abrasion resistance.

The floor coverings should further enable a good workability and an easy application in one layer.

Surprisingly, this object could be achieved by providing a multi-component composition comprising
a first component (A) comprising water, and
a second component (B) comprising at least one hydraulic binder.

The multi-component composition comprises a copolymer CP, wherein the copolymer is a vinyl versatate copolymer CPA, and/or a copolymer based on styrene and (meth) acrylic acid esters CPB.

The amount of hydraulic binder, based on the total weight of the multi-component composition, is from 25-65 weight-%.

The multi-component composition shows good fire resistance properties so that it can be classified as A2fl according to EN 13501-1.

The invention also relates to a method for preparing a flooring or coating with the multi-component composition. In a further embodiment, the invention provides the flooring obtainable by the method of the invention, in particular an industrial floor or a car park floor.

The invention also refers to the respective use of the multi-component composition as a flooring material, for car park floors or industrial floors.

DETAILED DESCRIPTION OF THE INVENTION

The average molecular weight is understood to mean the number average molecular weight, as determined using conventional methods, preferably by gel permeation-chromatography (GPC) using polystyrene as standard (Mw), styrene-divinylbenzene gel with porosity of 100 Angstrom, 1000 Angstrom and 10000 Angstrom as the column and tetrahydrofuran as a solvent, at 35° C.

The term "cementitious" refers to compositions including hydraulic binding agent such as cement and to the cured products thereof.

At first, the multi-component composition used according to the invention is explained. The multi-component composition comprises two or more individual components. The components are stored separately in order to avoid spontaneous reaction. The components may be assembled together as a package. For use the components are mixed with each other. The multi-component composition preferably consists of two components. Optionally however, one or more additional components may be included for specific purposes. For instance, an additional component comprising coloring agents, such as pigments, may be used for coloring purposes.

First Component (A)

The first component comprises water. Optionally, one or more additives may be added to the first component. The first component is preferably a liquid component. The first component may be viscous but is generally pourable.

Apart from the water, the first component may contain further additives. Such additives are commonly used, if desired, and typically known to the persons skilled in the art. Examples of further optional additives are plasticizers, pigments, adhesion promoters, such as silanes, e.g. epoxysilanes, (meth)acrylatosilanes and alkylsilanes, stabilizers against heat light and UV radiation, thixotropic agents, flow improving additives, flame retardants, surface active agents such as defoamers, wetting agents, flow control agents, deaerating agents, biocides and emulsifiers.

Preferably used optional additives for the polyol component are pigments, such as inorganic and organic pigments, e.g. Bayferrox® and Heucosin®; defoamers, such as solvent free and silicon free defoamers, e.g. solvent free and silicon free polymer-based defoamers, and polyorganosiloxanes, e.g. Tego®Airex and Efka®; and emulsifiers such as calcium hydroxide.

It can be preferable, especially if the copolymer CP is in the form of a powder in the second component (B), if the first component (A) exclusively consists of water, especially tap water.

Second Component (B)

The second component (B) comprises one or more hydraulic binding agents.

A hydraulic binding agent is a substantially inorganic or mineral material or blend, which hardens when mixed with water. Hydraulic binders also encompasses latent hydraulic binders or pozzolanic binders which usually requires activation, e.g. by the presence of lime, in order to show hydraulic properties. All hydraulic binders known to those skilled in the art are suitable.

Typical examples of hydraulic binders are at least one of cement, e.g. Portland cement, fly ash, granulated blast furnace slag, lime, such as limestone and quicklime, rice husk, calcined paper sludge, fumed silica and pozzolana or a mixture thereof.

The hydraulic binder preferably comprises cement, in particular Portland cement. Hydraulic binders such as cement often include in addition calcium sulfate, such as gypsum, anhydrite and hem ihydrate.

The amount of hydraulic binder, based on the total weight of the multi-component composition, is from 25-65 weight-%. If the amount is less than 25 weight-%, the cured composition does not provide sufficient applicability which results in uneven surfaces and leads to significantly structured surfaces and crack formation. In addition, the compositions have significantly decreased values for compressive strength and flexible strength. Further, the workability decreases. This can be seen for example in table 1 in the comparison of E3-E6 with Ref3-Ref6.

An amount of more than 65 weight-% leads to a decrease in applicability and workability and a decrease in gloss.

Preferably, the amount of hydraulic binder, based on the total weight of the multi-component composition, is from 27.5-60 weight-%, 30-60 weight-%, 35-60 weight-%, 40-60 weight-%, 45-55 weight-%, more preferably 50-55 weight-%. This lead to high values in sufficient compressive strength and flexible strength in combination with good applicability. This can be seen for example in table 1 in the comparison of E3-E6.

Further, the multi-component composition is preferably formulated such that the weight ratio of water to hydraulic binder is in the range of 0.30 to 0.65, 0.33 to 0.60, 0.33 to 0.55, 0.33 to 0.50, 0.33 to 0.45, preferably in the range of 0.33 to 0.4. This lead to high values in compressive strength and flexible strength in combination with good applicability. This can be seen for example in table 1 in the comparison of E3-E6.

The multi-component composition, especially in the second component, preferably comprises one or more aggregates. Aggregates are chemically inert, solid particulate materials. Aggregates come in various shapes, sizes, and materials ranging from fine particles of sand to large, coarse rocks. Examples of suitable aggregates are sand, such as silica sand, gravel, and crushed stone, slag, lightweight aggregates such as clay, pumice, perlite, and vermiculite. Sand, in particular silica sand, is preferred.

The grain size of the aggregates may vary depending on the application, but is preferably rather small, e.g. not more than 6 mm, preferably not more than 4 mm. The aggregate may have, for instance, a grain size in the range of 0.05 to 4 mm, preferably 0.1 to 3 mm, wherein sand, in particular silica sand, having a grain size in the range of 0.1 to 3 mm, is particularly preferred. For instance, sand having a grain size ranging from 0.3 to 0.8 mm or from 0.1 to 0.5 mm can be advantageously used in the present invention. The grain size range can be determined, e.g. by sieve analysis.

Preferably, the amount of aggregates, based on the total weight of the multi-component composition, is from 10-45 weight-%, 15-40 weight-%, more preferably 20-35 weight-%.

The multi-component composition, especially in the second component, preferably comprises calcium carbonate.

The calcium carbonate particles preferably have an average diameter D50 with a range from 1 to 200 μm, more preferably from 2 to 100 μm, 2 to 50 μm, 3 to 20 μm, 3 to 10 μm, even more preferably from 3 to 7.5 μm. This has the advantage of an increased abrasion resistance. This can be seen for example in table 4 in the comparison of E20-E27.

The D50 value of the cumulative frequency distribution of the calcium carbonate particles as obtained by laser diffraction methods indicates that 50% of the particles have a diameter equal to or less than the specified value. The size distribution curve can be determined by laser diffractometry.

Preferably, the amount of calcium carbonate, based on the total weight of the multi-component composition, is from 2.5-10 weight-%, 3.5-9 weight-%, 4-8 weight-%, 5-8 weight-%, more preferably 6-8 weight-%.

This lead to good workability in combination with higher gloss. This can be seen for example in table 2 in the comparison of E11-E15.

The multi-component composition, especially in the second component, preferably comprises flint, especially calcined flint.

This lead to a significant increase in abrasion resistance. This can be seen for example in table 5 in the comparison of E28/29 with E30/31, respectively E32/33 with E34/35.

The grain size of the flint may vary depending on the application, but is preferably rather small, e.g. not more than 6 mm, preferably not more than 4 mm. The flint may have, for instance, a grain size in the range of 0.1 to 4 mm, preferably 0.25 to 3 mm, 0.4 to 2.5 mm, 0.5 to 2.0 mm, most preferably 0.5 to 1.5 mm. The grain size range can be determined, e.g. by sieve analysis.

Preferably, the amount of flint, based on the total weight of the multi-component composition, is from 20-55 weight-%, 25-50 weight-%, 30-50 weight-%, 35-50 weight-%, more preferably 40-50 weight-%.

In case the multi-component composition comprises flint, the multi-component composition preferably contains:
 calcium carbonate, preferably calcium carbonate as mentioned before, preferably in an amount based on the total weight of the multi-component composition, from 2.5-10 weight-%, 3.5-9 weight-%, 4-8 weight-%, more preferably 4-6 weight-%;
 aggregates, preferably aggregates as mentioned before, preferably in an amount based on the total weight of the multi-component composition, from 5-20 weight-%, 7.5-15 weight-%, more preferably 9-12 weight-%;
 hydraulic binder, preferably hydraulic binder as mentioned before, preferably in an amount based on the total weight of the multi-component composition, from 25-40 weight-%, more preferably 26-35 weight-%;

a weight ratio of water to hydraulic binder in the range of 0.15 to 0.4, 0.175 to 0.30, 0.18 to 0.25, preferably in the range of 0.19 to 0.22.

Multi-component composition containing flint are specifically suited for the use as top coats for car park floors or industrial floors due to their high abrasion resistance. Such top coats preferably have a layer thickness from 0.3 mm to 2.0 mm, 0.3 mm to 1.5 mm, 0.5 mm to 1.2 mm, preferably 0.8 mm to 1 mm.

Preferably, the amount of copolymer CP, based on the total weight of the multi-component composition, is from 1-10 weight-%, 2-8.5 weight-%, 2.5-7 weight-%, 3-6.5 weight-%, 3-6 weight-%, 3.5-5.5 weight-%, more preferably 4-5 weight-%. This leads to high values in compressive strength, especially after 28 days, and high values in flexible strength, especially after 7 and 28 days, in combination with good applicability. Further, this leads to good applicability, good workability and high gloss.

This can be seen for example in table 2 in the comparison of Ref7 with E7-E9. Further, the inventive copolymer CP exhibit surprisingly good adhesion properties, whereas non-inventive copolymers were found to display insufficient pull-strength values. This can be seen for example in table 1 in the comparison of Ref1 and Ref2 with E1-E2.

The vinyl versatate copolymer CPA is preferably a vinyl versatate copolymer dispersion, more preferably a dispersion in which a vinyl versatate copolymer is dispersed in a dispersion medium, preferably water.

The vinyl versatate copolymer CPA is a copolymer containing vinyl versatate, which is an ester of versatic acid and vinyl alcohol, as a monomer unit—that is, a copolymer comprising monomer units including vinyl versatate.

Preferred of monomer units other than vinyl versatate are selected from the list consisting of ethylene, vinyl acetate and (meth)acrylesters.

The vinyl versatate copolymer may be, for example, a random copolymer, a block copolymer, or a graft polymer.

Preferably the vinyl versatate copolymer is selected from the group consisting of ethylene-vinyl acetate-vinyl versatate copolymer, vinyl acetate-vinyl versatate copolymer, vinyl acetate-vinyl versatate-(meth)acrylic acid ester copolymer and vinyl acetate-vinyl versatate-(meth)acrylic acid ester-ethylene copolymer, most preferably vinyl acetate-vinyl versatate copolymer.

Preferably the vinyl versatate copolymer has a number average mean particle size of 300 to 20 μm, preferably 150 to 50 μm.

The copolymer based on styrene and (meth) acrylic acid esters CPB is preferably based on styrene and (meth) acrylic esters, e.g. $C_1$-$C_7$ alkyl-, e.g. methyl or ethyl or butyl, acrylate or $C_1$-$C_7$ alkyl-, e.g methyl or ethyl or butyl, methacrylate, or of acrylam ides or methacrylam ides, e.g. N-methoxyacrylamide or N-methoxy-methacrylamide, and other unsaturated monomers.

Especially preferred are copolymers of two or more, preferably 3 or 4, monomers selected from the group consisting of styrene, (meth) acrylic acid, $C_1$-$C_7$ alkyl-(meth) acrylate, especially methyl, ethyl and butyl (meth) acrylate and (meth) acrylamide. More preferably, the copolymer is based on monomers selected from the group consisting of styrene, $C_1$-$C_7$ alkyl-(meth) acrylate, especially methyl, ethyl and butyl (meth) acrylate. Most preferably, the copolymer is based on monomers styrene, butylacrylate and butylmethacrylate.

Preferably the copolymer based on styrene and (meth) acrylic acid esters CPB is a dispersion, more preferably a aqueous dispersion.

Most preferably, the copolymer CP is a copolymer based on styrene and (meth) acrylic acid esters CPB, especially a copolymer CPB disclosed as preferred in the preceding text. Most preferably, the copolymer CPB is based on monomers selected from the group consisting of styrene, $C_1$-$C_7$ alkyl-(meth) acrylate, especially methyl, ethyl and butyl (meth) acrylate, especially the copolymer is based on monomers styrene, butylacrylate and butylmethacrylate.

Most preferably, the amount of copolymer CPB, based on the total weight of the multi-component composition, is from 1-10 weight-%, 2-8.5 weight-%, 2.5-7 weight-%, 3-6.5 weight-%, 3-6 weight-%, 3.5-5.5 weight-%, 3.5-5.0 weight-%, more preferably 3.5-4.5 weight-%.

This leads to high values in flexible strength, especially after 28 days, and a good balance/combination of high values in compressive strength, high flow and applicability without crack formation.

This can be seen for example in table 7 in the comparison of E36 and E40 with E37-E39, especially E38.

The multi-component composition may optionally comprise one or more additives, which are commonly used, if desired, and typically known to the persons skilled in the art of cementitious applications. Examples of suitable additives, which may be optionally used in the solid component are superplasticizer such as polycarboxylate ether (PCE), oil such as mineral oil, paraffin oil and organic oil, cellulose fibers, and inorganic or organic pigments.

Suitable Proportions for the MultiCcomponent Composition

As to the mixing ratio of the components of the multi-component composition, the weight ratio of components (A):(B) is preferably 1-1/6, preferably 1/2-1/5, more preferably 1/3-1/5.

Mixture

For using the multi-component composition e.g. as a coating for industrial floors or car parks, the components of the composition are mixed before usage.

When the components are mixed together, hydration and curing reactions begin so that the composition is to be processed within the open time after mixing the components. The term "open time" is understood to mean the duration of processability when the components are mixed with each other. The end of the open time is usually associated with viscosity increase of the composition such that processing of the compositions is no longer possible.

When the components are mixed, the one or more hydraulic binding agent reacts with water. This reaction is generally called hydration. Upon the reaction with water, the hydraulic binding agent is cured to a solid material.

Method for the Manufacture of the Floor Covering

The invention also relates to the method for the manufacture of a cementitious hybrid flooring or coating with the multi-component composition, wherein the method comprises a) mixing first component (A) and second component (B), b) applying the mixed material to a substrate, c) optionally smoothing the applied mixed material, and d) curing the applied mixed material, to obtain the cementitious hybrid flooring or coating.

In a preferred embodiment, the method is used to prepare an industrial floor or a car park floor.

Examples of suitable substrates on which the multicomponent composition can be applied are a screed floor, a concrete floor, a cement floor or slabs, in particular ground bearing slabs. The screed floor may be e.g. a cementitious screed or a polymer modified cementitious screed. The substrate may also be an existing flooring such as a resin coated flooring or any other known floor covering. The substrate is preferably formed of slabs, especially concrete slabs, in particular concrete ground bearing slabs.

The application of the multicomponent composition may be carried out by any common method, e.g. coating, casting, grouting, puttying. The flooring obtained may have e.g. a thickness of 1 to 9 mm.

The application temperature for the multi-component composition is preferably from 0 to 40° C., 8 to 40° C., preferably from 12 to 35° C.

The invention also relates to the flooring, preferably industrial floor or car park floor, obtainable by the method of the invention. The invention also relates to the use of the multi-component composition as a flooring material for car park floors or industrial floors.

The floor covering obtained has an improved chemical, abrasion and impact resistance so that it is suitable for places under severe conditions. It shows excellent crack-bridging properties and good water-proofing properties so that it exhibits good resistance to upcoming moisture. The floor covering of the invention is particularly suitable as an industrial floor covering and car park floor, especially when slabs or ground bearing slabs are the underground or substrate on which the floor is to be applied.

Preferably, the multicomponent composition has the following properties:

Compressive strength: >30, >35, preferably >40, >45, >50 N/mm$^2$

Flexural strength: 5-20, preferably 8-15 N/mm$^2$

Pull off strength: >1, >1.5, preferably >2, >3 N/mm$^2$

Taber abrasion (H-22 wheel): <3000, <2500 preferably <2000, <1500, <1000 g

Workability: flow of >250 mm, 300-450 mm, preferably 350-450 mm, after 5 min

Application: unstructured surface without cracks

Fire resistance properties: <3, <2.5, <2.0, preferably <1.5, <1.0 MJ/kg

The above mentioned properties are preferably measured as described in the experimental part.

The invention is further explained in the following experimental part, which, however, shall not be construed as limiting the scope of the invention. The proportions and percentages indicated are by weight, unless otherwise stated.

EXAMPLES

The following commercial products were used in the examples:

| | | |
|---|---|---|
| Ref9 | Sikafloor-210 PurCem, polyurethane cementitious hybrid flooring | Sika, Germany |
| Ref10 | Sikafloor-2530, waterborne epoxy flooring | Sika, Germany |
| RefCP1 | AVE191, 50 wt.-% solid in water, Acrylate/VeoVa based polymer. | Alberdingk Boley, Inc, USA |
| RefCP2 | VeoVa-WS45D, 41 wt.-% solid in water, VAc/VeoVa based polymer | Alberdingk Boley, Inc, USA |
| CPA | Axilat HP 8513, 100 wt.-% solid, poly-vinylacetate/vinylneodecanoate copolymer | Synthomer, Germany |
| CPB | Mowilith VDM 618, 50 wt.-% solid in water, acrylic-styrene copolymer based on the monomers styrene, n-butylacrylate and butylmethacrylate | Celanese Emulsions GmbH, Germany |
| Luxovit 1-1.5 mm | Luxovit, calcinated flint, grain size 1-1.5 mm. | Inter-minerals, Belgium |
| Luxovit 2-3 mm | Luxovit, calcinated flint, grain size 2-3 mm. | Inter-minerals, Belgium |
| Korodur 0.5-1 mm | Korodur Durop, product of electro-metallurgical smelting process, grain size 0.5-1 mm. | KORODUR International GmbH, Germany |
| Korodur 1-2 mm | Korodur Durop, product of electro-metallurgical smelting process, grain size 1-2 mm. | KORODUR International GmbH, Germany |
| CaCO3 5 µm | Omyacarb 5 GU, 5 µm CaCO3 | Omya Inc, USA |
| CaCO3 7 µm | Omyacarb 10 GU, 7 µm CaCO3 | Omya Inc, USA |
| CaCO3 15 µm | Omyacarb 15 GU, 15 µm CaCO3 | Omya Inc, USA |
| CaCO3 50 µm | Omyacarb 50 GU, 50 µm CaCO3 | Omya Inc, USA |
| Sand | Quartz sand GEBA/BCS 413, quartz sand with a grain size in the range from 0.06 to 0.03 mm | Quarzwerke Österreich GmbH, Melk, Austria |
| Cement | Valderrivas BL CEM I 52.5R, portland cement | Cementos Portland Valderrivas S.A., Pamplona, Spain |
| Pigment | Heucosin ® Grau G 7748 N (RAL 7032) | Heubach GmbH, Langelsheim, Germany |

Examples

A first component (A) containing water, pigment and the copolymer CP and a second component (B) containing the remaining products listed above were prepared with the products and weight portions given in Table 1-7 below. With respect to RefCP1, RefCP2 and CPB, the dry/solid weight of AVE191, VeoVa-WS45D and Mowilith VDM 618 respectively is shown in Table 1-7 and the contained water in these commercial products was added to "Water".

Measuring Methods

The properties of the multi-component compositions were tested according to the methods mentioned below. The results are shown in the tables 1-7. The weight ratio of water to hydraulic binder is indicated with "w/c".

Compressive strength (CS): The compressive strength was determined according to EN 13892-2 (DIN EN 196-1) after 1 day, 7 day, respectively 28 days of curing at 23° C./50% relative humidity.

Flexural strength (FS): The flexural strength was determined according to EN 13892-2 (DIN EN 196-1) after 1 day, 7 day, respectively 28 days of curing at 23° C./50% relative humidity.

Pull off strength/Bond strength (PS): The bond strength was determined using a tensile loading device according to EN 24624. At least 4 tests were performed according to DIN EN 1542 (07/1999) and EN 13892-8:2002.

All test specimens were stored at (23±2)° C. and (50±5)% relative humidity prior to the test. The tensile load was increased at a constant rate of (0.05±0.01) N/(mm$^2$s). The bond strength was calculated as the mean value from the 4 single values.

Taber abrasion (H-22/1000c or CS-17/1000c): The Taber abrasion was determined as the loss of material of the abraded surface of the coating material, caused by the cutting or scratching effect of an abrading wheel according to EN ISO 5470-1 (09/1999). A "Taber Abraser Model 5131" from Taber Industries was used as an abrasion testing machine in combination with a H-22 Calibrade wheel, respectively CS-17 Calibrase wheel, applying 1000 cycles. The abrasion was determined with an analytical balance in gram.

Fire resistance properties (A2fl): Fire resistance fire resistance properties were determined according to the Standard EN ISO 1716 (November 2010) of the EN13501/1 for a fire classification $A_{fl}$-S2.

After application and curing of the composition, the cured product was grinded with a cryomill to a homogeneous powder. 0.2 g of the powder was tested in a calorimetric bomb according to EN ISO 1716. The value was calculated as the mean value from the 3 independent measurements.

Application: The application was determined according to the following method: The respective components must be each at a temperature of 20° C.±2° C. before mixing. The components are mixed and the testing material obtained is then poured onto a test surface and brought to equally level by using a roller. The resulting layer after curing was visually assessed as well as by touching the surface by hand using the following classification:

"Bit structured" means that remaining marks of the roller could be visually detected but not by touch.
"Structured" means that remaining marks of the roller could detected by touch.
"Mortar-like" means that the mixed composition was difficult to bring to equally level by using a roller.
If neither "Bit structured" nor "Structured" was used as classification then no remaining marks of the roller could be visually detected.
"Matt" means a matt appearance of the cured surface.
"Glossy" means a glossy appearance of the cured surface.

Workability (Flow): The workability refers to flow/consistency which are determined at 23° C./50% relative humidity using the cone as described in DIN EN 1015-3, but without tamping the material. The cone is set on the glass sheet, filled to the rim, lifted and the diameter of the resulting circle (in mm) is determined after 5 min and 8 min respectively.

In Table 7, the composition E36 was too dry/mortar like in order to determine flow, application, CS or FS. With respect to application showed the compositions E37 and E38 no crack formation (n.c.). Composition E39 showed one small crack (only 1) and E40 showed several cracks (several cracks).

TABLE 1

| | Ref1 | Ref2 | E1 | E2 | E3 | E4 | E5 | E6 | Ref3 | Ref4 | Ref5 | Ref6 |
|---|---|---|---|---|---|---|---|---|---|---|---|---|
| RefCP1 | 6.6 | | | | | | | | | | | |
| RefCP2 | | 6.6 | | | | | | | | | | |
| CPA | | | 6.6 | | 4.8 | 4.8 | 4.8 | 4.8 | 4.8 | 4.8 | 4.8 | 4.8 |
| CPB | | | | 6.6 | | | | | | | | |
| Water | 17.8 | 17.8 | 17.8 | 17.8 | 17.8 | 17.8 | 17.8 | 17.8 | 17.8 | 17.8 | 17.8 | 17.8 |
| Cement | 52.1 | 52.1 | 52.1 | 52.1 | 55.3 | 52.1 | 44.6 | 32.4 | 24.3 | 16.2 | 8.1 | 0 |
| Sand | 14.0 | 14.0 | 14.0 | 14.0 | 12.6 | 15.8 | 23.3 | 35.5 | 43.6 | 51.7 | 59.8 | 67.9 |
| $CaCO_3$ 7 μm | 7.6 | 7.6 | 7.6 | 7.6 | 7.6 | 7.6 | 7.6 | 7.6 | 7.6 | 7.6 | 7.6 | 7.6 |
| Pigment | 1.9 | 1.9 | 1.9 | 1.9 | 1.9 | 1.9 | 1.9 | 1.9 | 1.9 | 1.9 | 1.9 | 1.9 |
| Sum (wt.-%) | 100 | 100 | 100 | 100 | 100 | 100 | 100 | 100 | 100 | 100 | 100 | 100 |
| w/c | | | | | 0.32 | 0.34 | 0.40 | 0.55 | 0.73 | 1.10 | 2.20 | — |
| Flow 5 min | n.d. | n.d. | n.d. | n.d. | 339 | 374 | 390 | 402 | 391 | 355 | 319 | 112 |
| Flow 8 min | n.d. | n.d. | n.d. | n.d. | 365 | 382 | 399 | 427 | 405 | 374 | 325 | 112 |
| Application | n.d. | n.d. | n.d. | n.d. | matt | glossy | glossy | glossy | glossy, structured | glossy, structured | glossy, structured cracks, | matt, structured, mortar-like |
| CS 1 d [$N/mm^2$] | n.d. | n.d. | n.d. | n.d. | n.d. | 40.7 | 32.2 | 19.5 | 10 | n.d. | n.d. | n.d. |
| CS 7 d [$N/mm^2$] | n.d. | n.d. | n.d. | n.d. | n.d. | 70.3 | 57.9 | 43 | 29.4 | n.d. | n.d. | n.d. |
| CS 28 d [$N/mm^2$] | n.d. | n.d. | n.d. | n.d. | n.d. | 71.9 | 69.4 | 50.9 | 40.3 | n.d. | n.d. | n.d. |
| FS 1 d [$N/mm^2$] | n.d. | n.d. | n.d. | n.d. | n.d. | 6.8 | 6.3 | 4.9 | 2.6 | n.d. | n.d. | n.d. |
| FS 7 d [$N/mm^2$] | n.d. | n.d. | n.d. | n.d. | n.d. | 13.6 | 12.1 | 9.7 | 6.9 | n.d. | n.d. | n.d. |
| FS 28 d [MPa] | n.d. | n.d. | n.d. | n.d. | n.d. | 14.8 | 14.8 | 12.6 | 11.2 | n.d. | n.d. | n.d. |
| PS [$N/m^2$] | 1.00 | 0.60 | 1.53 | 1.50 | n.d | n.d | n.d | n.d | n.d | n.d | n.d | n.d | n.d. = not determined

TABLE 2

| | Ref7 | E7 | E8 | E9 | E10 | E11 | E12 | E13 | E14 | E15 |
|---|---|---|---|---|---|---|---|---|---|---|
| CPA | — | 2.0 | 4.8 | 6.1 | 8.1 | 4.8 | 4.8 | 4.8 | 4.8 | 4.8 |
| CPB | | | | | | | | | | |
| Water | 17.8 | 17.8 | 17.8 | 17.8 | 17.8 | 17.8 | 17.8 | 17.8 | 17.8 | 17.8 |
| Cement | 52.1 | 52.1 | 52.1 | 52.1 | 52.1 | 52.1 | 52.1 | 52.1 | 52.1 | 52.1 |
| Sand | 20.6 | 18.5 | 15.8 | 14.5 | 12.5 | 25.3 | 21.2 | 17.7 | 13.1 | 9.1 |
| $CaCO_3$ 7 μm | 7.6 | 7.6 | 7.6 | 7.6 | 7.6 | 0 | 4.1 | 7.6 | 12.2 | 16.2 |
| Pigment | 1.9 | 1.9 | 1.9 | 1.9 | 1.9 | 1.9 | 1.9 | 1.9 | 1.9 | 1.9 |
| Sum | 100 | 100 | 100 | 100 | 100 | 100 | 100 | 100 | 100 | 100 |
| w/c | 0.34 | 0.34 | 0.34 | 0.34 | 0.34 | 0.34 | 0.34 | 0.34 | 0.34 | 0.34 |
| Flow 5 min | 457 | 424 | 374 | 313 | 212 | 380 | 371 | 374 | 273 | 140 |
| Flow 8 min | 470 | 449 | 382 | 320 | 221 | 386 | 379 | 382 | 275 | 140 |
| Application | bit glossy | glossy | glossy | glossy, bit structured | glossy, bit structured | bit glossy, | glossy, | glossy | glossy, | bit glossy |
| CS 1 d [$N/mm^2$] | 51.9 | 49 | 40.7 | n.d. | n.d. | n.d. | n.d. | n.d. | n.d. | n.d. |
| CS 7 d [$N/mm^2$] | 70.7 | 70.1 | 70.3 | n.d. | n.d. | n.d. | n.d. | n.d. | n.d. | n.d. |
| CS 28 d [$N/mm^2$] | 67.3 | 72.9 | 71.9 | n.d. | n.d. | n.d. | n.d. | n.d. | n.d. | n.d. |

TABLE 2-continued

|  | Ref7 | E7 | E8 | E9 | E10 | E11 | E12 | E13 | E14 | E15 |
|---|---|---|---|---|---|---|---|---|---|---|
| FS 1 d [N/mm$^2$] | 7.5 | 6.9 | 6.8 | n.d. | n.d. | n.d. | n.d. | n.d. | n.d. | n.d. |
| FS 7 d [N/mm$^2$] | 10.9 | 11.7 | 13.6 | n.d. | n.d. | n.d. | n.d. | n.d. | n.d. | n.d. |
| FS 28 d [N/mm$^2$] | 11.7 | 13.6 | 14.8 | n.d. | n.d. | n.d. | n.d. | n.d. | n.d. | n.d. | n.d. = not determined

TABLE 3

|  | E16 | E17 | E18 | E19 | Ref8 |
|---|---|---|---|---|---|
| CPA |  |  |  |  |  |
| CPB | 4.6 | 4.6 | 4.6 | 4.6 | 4.6 |
| Water | 13.8 | 13.8 | 13.8 | 13.8 | 13.8 |
| Cement | 55.3 | 52.1 | 44.6 | 32.4 | 24.3 |
| Sand | 16.8 | 20.0 | 27.6 | 37.9 | 47.8 |
| CaCO$_3$ 7 µm | 8.1 | 8.1 | 8.1 | 8.1 | 8.1 |
| Pigment | 1.4 | 1.4 | 1.3 | 3.2 | 1.4 |
| Sum | 100 | 100 | 100 | 100 | 100 |
| w/c | 0.25 | 0.26 | 0.31 | 0.43 | 0.57 |
| Flow 5 min | 370 | 360 | 373 | 370 | 357 |
| Flow 8 min | 397 | 396 | 393 | 406 | 380 |
| Application | matt, bit structured | matt, bit structured | matt | matt | matt, structured too soft |
| CS 1 d [N/mm$^2$] | 47.72 | 37.45 | 37.02 | 24.8 | |
| CS 7 d [N/mm$^2$] | 82.57 | 62.62 | 58.88 | 55.83 | 42.2 |
| CS 28 d [N/mm$^2$] | 88.05 | 65.12 | 69.42 | 60.07 | 50.32 |
| FS 1 d [N/mm$^2$] | 8.23 | 6.29 | 5.85 | 4.05 | 1.08 |
| FS 7 d [N/mm$^2$] | 14.6 | 6.4 | 8.17 | 6.4 | 4.65 |
| FS 28 d [N/mm$^2$] | 17.56 | 9.82 | 14.72 | 10.06 | 9.09 | n.d. = not determined

TABLE 4

|  | E20 | E21 | E22 | E23 | E24 | E25 | E26 | E27 |
|---|---|---|---|---|---|---|---|---|
| CPA | 4.8 | 4.8 | 4.8 | 4.8 |  |  |  |  |
| CPB |  |  |  |  | 4.8 | 4.8 | 4.8 | 4.8 |
| Water | 17.8 | 17.8 | 17.8 | 17.8 | 17.8 | 17.8 | 17.8 | 17.8 |
| Cement | 52.1 | 52.1 | 52.1 | 52.1 | 52.1 | 52.1 | 52.1 | 52.1 |
| Sand | 15.8 | 15.8 | 15.8 | 15.8 | 15.8 | 15.8 | 15.8 | 15.8 |
| CaCO$_3$ 5 µm | 7.6 |  |  |  | 7.6 |  |  |  |
| CaCO$_3$ 7 µm |  | 7.6 |  |  |  | 7.6 |  |  |
| CaCO$_3$ 15 µm |  |  | 7.6 |  |  |  | 7.6 |  |
| CaCO$_3$ 50 µm |  |  |  | 7.6 |  |  |  | 7.6 |
| Pigment | 1.9 | 1.9 | 1.9 | 1.9 | 1.9 | 1.9 | 1.9 | 1.9 |
| Sum | 100 | 100 | 100 | 100 | 100 | 100 | 100 | 100 |
| w/c | 0.34 | 0.34 | 0.34 | 0.34 | 0.34 | 0.34 | 0.34 | 0.34 |
| H-22/1000c [g] | >15 | >15 | >15 | >15 | 4.5 | 4.5 | 5.5 | >15 |
| CS-17/1000c [g] | 0.45 | 0.52 | 0.57 | 0.63 | n.d | n.d | n.d | 0.86 | n.d. = not determined

TABLE 5

|  | E28 | E29 | E30 | E31 | E32 | E33 | E34 | E35 |
|---|---|---|---|---|---|---|---|---|
| CPB | 5.8 | 5.8 | 5.8 | 5.8 | 5.8 | 5.8 | 5.8 | 5.8 |
| Water | 5.7 | 5.7 | 5.7 | 5.7 | 5.7 | 5.7 | 5.7 | 5.7 |
| Cement | 26.5 | 26.5 | 26.5 | 26.5 | 30.0 | 30.0 | 30.0 | 30.0 |
| Sand | 9.8 | 9.8 | 9.8 | 9.8 | 11.7 | 11.7 | 11.7 | 11.7 |
| CaCO$_3$ 7 µm | 4.7 | 4.7 | 4.7 | 4.7 | 4.7 | 4.7 | 4.7 | 4.7 |
| Luxovit 1-1.5 mm | 46.9 |  |  |  | 41.3 |  |  |  |
| Luxovit 2-3 mm |  | 46.9 |  |  |  | 41.3 |  |  |
| Korodur 0.5-1 mm |  |  | 46.9 |  |  |  | 41.3 |  |
| Korodur 1-2 mm |  |  |  | 46.9 |  |  |  | 41.3 |
| Pigment | 0.6 | 0.6 | 0.6 | 0.6 | 0.8 | 0.8 | 0.8 | 0.8 |
| Sum | 100 | 100 | 100 | 100 | 100 | 100 | 100 | 100 |
| w/c | 0.22 | 0.22 | 0.22 | 0.22 | 0.19 | 0.19 | 0.19 | 0.19 |
| H-22/1000c [g] | 3.71 | 2.56 | 7.84 | 5.23 | 2.69 | 2.13 | 6.02 | 8.40 |

TABLE 6

|  | E21 | E25 | Ref9 | Ref10 |
|---|---|---|---|---|
| $A2_{fl}$ [MJ/kg] | <0.5 | <0.5 | >5 | >5 |

TABLE 7

|  | E36 | E37 | E38 | E39 | E40 |
|---|---|---|---|---|---|
| CPA |  |  |  |  |  |
| CPB | 0.5 | 2.5 | 4.0 | 5.0 | 7.5 |
| Water | 17.8 | 17.8 | 17.8 | 17.8 | 17.8 |
| Cement | 52.1 | 52.1 | 52.1 | 52.1 | 52.1 |
| Sand | 19.6 | 16.6 | 14.6 | 10.6 | 5.6 |
| CaCO₃ 7 μm | 7.6 | 7.6 | 7.6 | 7.6 | 7.6 |
| Pigment | 1.9 | 1.9 | 1.9 | 1.9 | 1.9 |
| Sum | 100 | 100 | 100 | 100 | 100 |
| w/c | 0.34 | 0.34 | 0.34 | 0.34 | 0.34 |
| Flow 5 min | n.d. | 330 | 346 | 421 | >450 |
| Flow 8 min | n.d. | 335 | 350 | 432 | >450 |
| Application | Mortar-like | n.c. | n.c. | only 1 | several cracks |
| CS 1 d [N/mm²] | n.d. | 43.0 | 38.0 | 45.0 | 23.0 |
| CS 28 d [N/mm²] | n.d. | 66.5 | 64.5 | 65.5 | 52.0 |
| FS 1 d [N/mm²] | n.d. | 8.0 | 8.0 | 8.5 | 7.0 |
| FS 28 d [N/mm²] | n.d. | 19.5 | 20.5 | 20.5 | 17.5 | n.d. = not determined,
n.c. = no cracks

The invention claimed is:

1. A multi-component composition comprising
a first component (A) comprising water, and
a second component (B) comprising at least one hydraulic binder,
wherein:
the multi-component composition comprises a copolymer CP in an amount in a range of 2.5-7 weight-% based on a total weight of the multi-component composition,
the copolymer is a vinyl versatate copolymer CPA, and/or a copolymer based on styrene and (meth) acrylic acid esters CPB,
an amount of the at least one hydraulic binder, based on the total weight of the multi-component composition, is in a range from 40-60 weight-%, and
a weight ratio of the water to the at least one hydraulic binder is in a range of 0.30 to 0.65.

2. The multi-component composition according to claim 1, wherein the vinyl versatate copolymer CPA is selected from the group consisting of ethylene-vinyl acetate-vinyl versatate copolymer, vinyl acetate-vinyl versatate copolymer, vinyl acetate-vinyl versatate-(meth)acrylic acid ester copolymer and vinyl acetate-vinyl versatate-(meth)acrylic acid ester-ethylene copolymer.

3. The multi-component composition according to claim 1, wherein the copolymer based on styrene and (meth) acrylic acid esters CPB is based on two or more monomers selected from the group consisting of styrene, (meth) acrylic acid, $C_1$-$C_7$ alkyl-(meth) acrylate, and (meth) acrylamide.

4. The multi-component composition according to claim 1, further comprising one or more aggregates.

5. The multi-component composition according to claim 1, further comprising calcium carbonate.

6. The multi-component composition according to claim 5, wherein the amount of calcium carbonate, based on the total weight of the multi-component composition, is in a range from 2.5-10 weight-%.

7. The multi-component composition according to claim 1, further comprising flint.

8. The multi-component composition according to claim 7, wherein the amount of flint, based on the total weight of the multi-component composition, is in a range from 20-55 weight-%.

9. The multi-component composition according to claim 1, further comprising calcium carbonate in an amount in a range of 3.5-9 weight-% based on the total weight of the multi-component composition.

10. The multi-component composition according to claim 1, further comprising calcium carbonate in an amount in a range of 4-8 weight-% based on the total weight of the multi-component composition.

11. The multi-component composition according to claim 1, wherein the multi-component composition is a flooring composition, a coating composition or a grout composition.

12. A multi-component composition comprising
a first component (A) comprising water, and
a second component (B) comprising at least one hydraulic binder,
wherein:
the multi-component composition comprises a copolymer CP in an amount in a range of 2.5-7 weight-% based on a total weight of the multi-component composition,
the copolymer CP is a copolymer based on styrene and (meth) acrylic acid esters CPB,
an amount of the at least one hydraulic binder, based on the total weight of the multi-component composition, is in a range from 25-65 weight-%, and
a weight ratio of the water to the at least one hydraulic binder is in a range of 0.30 to 0.65.

13. The multi-component composition according to claim 12, wherein the amount of the at least one hydraulic binder, based on the total weight of the multi-component composition, is in a range from 40-60 weight-%.

14. The multi-component composition according to claim 12, wherein the copolymer based on styrene and (meth) acrylic acid esters CPB is based on two or more monomers selected from the group consisting of styrene, (meth) acrylic acid, $C_1$-$C_7$ alkyl-(meth) acrylate, and (meth) acrylamide.

15. The multi-component composition according to claim 12, further comprising one or more aggregates.

16. The multi-component composition according to claim 12, further comprising calcium carbonate.

17. The multi-component composition according to claim 16, wherein the amount of calcium carbonate, based on the total weight of the multi-component composition, is in a range from 2.5-10 weight-%.

18. The multi-component composition according to claim 12, further comprising flint, wherein the amount of flint, based on the total weight of the multi-component composition, is in a range from 20-55 weight-%.

19. A method for the manufacture of a flooring or coating with the multi-component composition according to claim 1, the method comprising:
a) mixing the first component (A) and the second component (B),
b) applying the mixed material to a substrate,
c) optionally smoothing the applied mixed material, and
d) curing the applied mixed material, to obtain the flooring or coating.

20. A flooring or coating, manufactured by the method of claim 19.

* * * * *